United States Patent [19]

Hard

[11] 3,910,636

[45] Oct. 7, 1975

[54] PROCESS FOR IN-SITU MINING

[75] Inventor: Robert A. Hard, Lexington, Mass.

[73] Assignee: Kennecott Copper Corporation, New York, N.Y.

[22] Filed: Dec. 6, 1973

[21] Appl. No.: 422,232

[52] U.S. Cl.................... 299/5; 75/101 R; 299/4; 423/27
[51] Int. Cl.²......................................... E21C 41/08
[58] Field of Search.......... 423/27, 32, 33, 150, 23; 75/117, 119, 101 R; 299/4, 5

[56] References Cited
UNITED STATES PATENTS

| | | | |
|---|---|---|---|
| 287,737 | 10/1883 | Stetefeldt | 423/41 |
| 659,340 | 10/1900 | Collins | 75/117 X |
| 1,508,561 | 9/1924 | Libby | 423/45 |
| 2,563,623 | 8/1951 | Scott | 299/5 X |
| 2,805,936 | 9/1957 | Schaufelberger | 75/117 X |
| 2,954,218 | 9/1960 | Dew et al. | 299/4 |
| 3,273,997 | 9/1966 | Wilson | 423/150 X |
| 3,278,232 | 10/1966 | Fitch et al. | 299/4 |
| 3,322,532 | 5/1967 | Wieder | 423/33 |
| 3,330,648 | 7/1967 | Vian-Ortuno et al. | 423/150 |

*Primary Examiner*—David H. Brown
*Attorney, Agent, or Firm*—Lowell H. McCarter; John L. Sniado

[57] ABSTRACT

In-situ mining of various metals such as copper from underground formations is effectively carried out by employing an acidic leaching solution containing nitrate ions and having a pH value of from about 0.2 to about 2.0.

9 Claims, No Drawings

PROCESS FOR IN-SITU MINING

The present invention relates to processes for in-situ mining for the recovery of certain metal values from underground formations or ore deposits. More specifically, this invention relates to processes for in-situ mining by employment of novel leaching solutions.

The prior art considered in conjunction with the preparation of this specification is as follows (all U.S. patents): U.S. Pat. Nos. 287,737; 404,794; 514,041; 649,296; 732,641; 759,191; 805,017; 914,730; 1,083,911; 1,084,600; 1,119,473; 1,144,480; 1,150,787; 1,210,724; 1,378,485; 1,508,561; 2,219,633; 2,304,823; 2,726,934; 2,805,936; 3,088,820; 3,169,856; 3,273,997; 3,330,648; and 3,656,937. All of these publications are to be considered as incorporated herein by reference.

Presently many mineral mines, located throughout the Western United States, are not in a position to be commercially developed because of their low ore concentration and/or because they are located at remote regions which makes them economically unfeasible for conventional type exploitation. Even ore bodies possessing relatively high ore concentration and located in accessible regions may have its valuable deposit at a depth that conventional mining may not be mechanically or economically feasible.

In recent years a process for tapping these underground ore bodies, in-situ, has evolved which has resulted in recovering some mineral values which were formerly considered inaccessible by conventional mining techniques. The process consists mainly of drilling a well into an underground ore deposit and then introducing a leach solution to contact the ore therein. The leach solution dissolves the mineral within the ore deposit and thereafter the pregnant solution is recovered and processed by conventional extraction means to recover the particular mineral values therefrom.

In conjunction with this in-situ solution mining, it is known in the art that various ores, for example, chalcopyrite and most other primary sulfide minerals, are not effectively dissolved by the leaching solution or the rate of solution is so slow that any such process is impractical. It is known that to leach sulfides the addition of an oxidizing agent, such as oxygen, chlorine and the like, is required. However, the prior art has incurred numerous problems in conjunction with the utilization of a gaseous oxidizing agent in view of the fact that such oxidizing agents are not very soluble in the leaching solution at atmospheric pressure and consequently the resultant pregnant leaching solution contains small concentrations of mineral values therein, thereby rendering even solution mining economically unfeasible. Consequently, it has been a continuous problem confronting the prior art to find a means for providing the maximum oxidizing power in a leaching solution at the lowest cost possible. The inherent disadvantages of the prior art processes have now been overcome by the present invention.

Accordingly, it is one object of the present invention to provide a process for supplying the maximum oxidizing power in a leaching solution at the lowest cost possible.

It is still a further object of the present invention to provide a process for solution mining of subterranean deposits of chalcopyrite in order to obtain maximum quantities of copper metal values in the leaching solution.

These and other objects of the present invention will be readily apparent in conjunction with the description of the present invention hereinafter set forth, including the appended claims.

The objects of the present invention are accomplished by a hydrometallurgical process which uses an acidic leaching solution containing nitrate ions and having a pH of from about 0.2 to about 2.0. Preferably the pH range will be between about 0.5 to 1.5. After drilling at least one well and sealing at least a portion thereof, the leaching solution is introduced into the wellbore and then into the zone in the formation immediately surrounding said wellbore. In this manner, it has been found that such leaching solution can extract substantial quantities of metal values into the solution.

The acidic leaching solution has been found to be a very inexpensive oxidizing agent and lixiviant and functions extremely well in the recovery of mineral deposits, particularly those in the sulfide state.

This acidic (aqueous) leaching solution has two critical features which constitute at least a portion of the inventive concept herein. The first critical feature is the utilization of the nitrate ion. The nitrate ion can be furnished by any means including, without limitation, both organic and inorganic compounds. Examples of such compounds include, without limitation, alkali metal (sodium, potassium, lithium, and cesium) nitrates, ammonium nitrate, ferric nitrate, and nitric acid. The nitrate material, e.g. $NaNO_3$, is present in the leaching solution in any amount in order to obtain the desired end result. It is preferred, however, that such nitrate material be present in an amount of from about 1 to about 10.0% by weight based on the total weight of the leaching solution.

The second critical feature of the leaching solution is the acidity thereof. The ratio of hydrogen ion ($H^+$) to nitrate ion ($NO_3^-$) in the leach solution must be at least 4. Any ratio greater than 4 provides excess acid capacity. It has been found that it is important to maintain the pH thereof at a value below 2 and preferably of from about 0.2 to about 1.5. Higher and lower pH values will not substantially achieve the desired end result. At higher pH values the reaction rate is slowed to the point of being completely impracticable. At lower pH values, the acid needed to react with the nitrate ion and the sulfides in the ore body is preferentially consumed by the host rock, consequently making the nitrate ion less effective as an oxidizing agent. Thus the process is to be operated in a range of pH values where the acid consumption by the host rock can be and is minimized.

The leach solution is made up to supply sufficient acid capacity such that nitric oxide (NO) is produced in the ore. Thus for each nitrate ion ($NO_3^-$) present there must be at least four hydrogen ions ($H^+$). The acidity of the leaching solution is desirably provided by $H_2SO_4$.

The advantage of using $H_2SO_4$ as an acid source is that the bisulfate ion ($HSO_4^-$) is used to buffer the system so that the hydrogen ion ($H^+$) can be supplied to the reaction at a pH value above about 0.5. Thus the expected preponderant reaction may typically be represented as $$CuFeS_2 + \frac{4}{3} NO_3^- + \frac{16}{3} H^+ \rightarrow$$

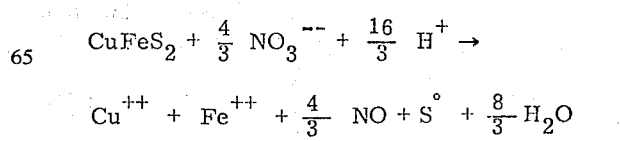

This helps avoid excessive consumption of the oxidizing power of the leach solution by the host rock.

The temperature of the acidic leaching solution which is supplied to the underground leaching zone is preferably above about 30° C. The temperature of the underground leaching zone preferably is above about 30° C. If necessary heat may be supplied to the underground ore body. However the temperature of the acid leach solution, which is supplied to the wellbore, is any temperature which will produce the desired end result. Thus the acid leach solution may be supplied at ambient temperature up to 90° C or more and preferably above about 30° C to about 75° C.

The proper analysis of an ore body, along with the effect produced by varying the concentration of the leaching solution and pumping pressure thereof, can be used to provide the optimum combination of these ingredients for recovering maximum metal values from the ore body. However, a limiting factor in deciding the pressure is to limit it to a value at which rock failure and/or ground level uplift occurs. In addition, the pressure limitation should depend on the permeability, depth of ore deposit, hydrostatic head pressure, extent of ore formation and the rate of oxidation of the ore, so that the volume penetrated by the leaching solution will be substantially confined to a zone wherein it can be recovered from without being excessively diluted with ground water.

The preliminary step to be conducted in the leaching operation of this invention is to test and analyze a sample of the ore body so as to ascertain the extent of its mineral content. A lithological study of the ore body will reveal the porosity and permeability of the ore and the materials surrounding it. One method presently employed for this purpose is to drill out cores of the ore formation at different depth intervals and then have the cores chemically analyzed to determine permeability and ore level formation.

Analysis of core data will determine the extent of fracturing in the prophyry, the width of the fractures, the ease with which fluids may flow in the fractures, and the amount of recoverable metal disseminated within the fractures. Fluid injectivity tests, before and after treatments to increase permeability, at the wells within the ore body can give a direct measure of the transmissibility of fluids. These factors can be used by one of ordinary skill in the art to determine the optimum residence time for a given strength of leaching solution. Continued monitoring of the withdrawn pregnant leaching solution will indicate the necessity for adjustments of the flow rate of the leaching solution to more closely approach an optimum residence time. Such an adjustment of flow rate may be necessitated by a change in conditions, such as depletion of available metal-containing ore in the fracture system during the life of the process.

Once this information is obtained and evaluated, and found to contain the desired metal, a wellbore (or a series of wellbores where one uses at least one injection well and at least one recovery well), is drilled into the ore body. The leaching solution is then introduced under pressure through the well into the ore body located below the ground water level.

It is to be understood that this invention can be practiced by using only one well for introducing the liquid leaching solution and then recovering the pregnant solution therefrom. Also two or more wells penetrating the ore body may be used so that the leaching solution can be introduced into the ore body through at least one well and the pregnant solution recovered from at least one different well.

After the leaching solution has passed through the ore body and remains in contact with the ore body for suitable residence time, the pregnant leaching solution is withdrawn. This solution will contain, for example where chalcopyrite is contacted, cupric sulfate and ferrous sulfate. This solution is then passed to a next stage for the removal of the metal (e.g. copper) from the solution.

It is desirable in the practice of Applicant's invention that the residence time of the leaching solution in the ore body be controlled. If the leaching solution is withdrawn too rapidly, the leaching solution will not sufficiently react with the metal (e.g. copper) bearing ore. If the solution is withdrawn too slowly, essentially all of the nitrate ions will have reacted and valuable time will be lost as the pregnant leaching solution remains unrecovered in the ore body. The optimum residence time will be the time period necessary for obtaining the maximum copper loading in the leach solution.

A shorter or longer period will be less than optimum.

It is difficult to predict precisely the optimum residence time. However, the optimum residence time can be reasonably approximated from known characteristics of the ore body such as the extent of the fracture system, the average permeability of the system, and the amount of recoverable minerals, e.g. copper sulfides, present in the fractures. These characteristics can be determined from laboratory analysis of core samples. The operating conditions for the process should also be taken into consideration. These conditions include the spacing between the input and withdrawal wells, the pressure drop between the wells and the strength of the leaching solution.

The residence time as determined by these factors can be adjusted as experience dictates. Qualitative and quantitative analysis of samples taken from the pregnant leaching solution can be made to determine if change in residence time is necessary.

The leaching method outlined hereinbefore is particularly applicable to the economic recovery of copper from deep deposits of primary copper sulfides, such as chalcopyrite ($CuFeS_2$). For economic recovery of copper values from most deeply buried copper sulfide deposits, a leaching solution containing at least about 0.5 molar nitrate ion, 0.3 molar $H_2SO_4$ and 0.3 molar $Na_2SO_4$ and having a pH value of about 0.5 will be satisfactory. Sodium sulfate $Na_2SO_4$ concentration in the leach solution may range from about 0.3 molar up to about 12.0 molar. Sodium sulfate is the preferred salt to adjust and control the pH value. However, any soluble inorganic sulfate salt may be used; non-limiting specific examples include ferrous sulfate, ammonium sulfate, zinc sulfate, and magnesium sulfate.

The copper goes into solution as a sulfate and may be thus recovered by replacement with metallic iron which causes the copper to precipitate, or by electrolysis which causes the copper to precipitate at the cathode. It is to be understood that other known methods such as precipitation by gaseous reduction of liquid-liquid ion exchange may be used to recover the metal values from the leach solution.

It will be appreciated that the leaching method of the present invention may be likewise applied to the recovery of other elements from their primary ores in a substantially similar manner to that detailed for copper. For primary ores of elements similar to copper, the present invention leaching solution is highly suitable. For ores containing various other elements, the present invention leaching solution is also effective for employment in the leaching process.

In some instances it may be desirable to increase the reaction rate by increasing temperature. To this end the leaching solution may be heated prior to its introduction to the wellbore. However, it should be noted that the oxidation process is exothermic and heat is deposited in the wellbore such that the in-situ temperature is already relatively high without additional heating in the aforementioned manner. Consequently, by virtue of the tremendous quantity of ore that can be processed in the wellbore at one time, somewhat slower reaction rates carried out at the in-situ temperatures can be economically tolerated.

It is a preferred embodiment of the present invention to utilize the process for the solution mining of copper from subterranean formations in a particular pattern design of injection and production wells. It is preferred that the injection and production wells either be drilled in concentric patterns about each other with a single production well contained within the center of the pattern, for example a five-spot, or that the injection and production wells be drilled in offsetting line patterns so as to form a line drive mechanism within the copper formation. Generally, the distance between the injection and production wells will be from 20 to 1,000 feet, with particular depth, thickness, permeability, porosity, water saturation of the formation, and economic value of the copper mineral contained therein being the engineering constraints upon which the design of the solution mining patterns are based. Therefore, through patterned well completion in the copper formation, the process may be used sequentially across the copper deposit through a series of line drive wells or concentric pattern wells so that the entire copper deposit may be leached.

EXAMPLE I

An ore body 100 acres in area and averaging 500 feet in thickness lies at an average depth of 4,000 feet below the surface of the earth in Arizona. Samples of the ore shows that it is composed primarily of granitic igneous rock and that it contains chalcopyrite as the principal copper mineral. The ore samples also show that it contains approximately 1.4 weight percent chalcopyrite, approximately 1.0 weight percent pyrite, and that the total copper content of the ore averages 0.5 percent.

Approximately five wells (each 4,500 feet deep) are drilled into the ore body in an array such as to provide a five-spot pattern, and the wells are completed (sealed and cased to 4,000 feet) such that fluids may be either injected or produced from individual wells.

A leaching solution containing 0.5 molar M $HNO_3$, 0.3 molar $H_2SO_4$ and 0.3 molar $Na_2SO_4$ and having a pH of 0.5 is continuously injected into the center wellbore, at a rate of 45 gallons per minute, and at an injection pressure of 310 psi.

The pregnant leaching solution is recovered from the four recovery wells approximately 20 days later, and laboratory analysis shows it to contain an average of about 5.0 grams of copper per liter of solution.

Example I is repeated except that the $H_2SO_4$ is only used in an amount to maintain the leaching solution at a pH of 2.5. The recovered solutions show that copper is present in an amount of only 0.1 gram per liter. Thus, it can readily be seen that the pH of the leaching solution is critical and has a significant effect on the efficacy of the leaching solution.

It should also be understood that while it is preferred to conduct the process in an ore body between an input and withdrawal well a single well process is also included within the scope of the invention. In a single well process, the leaching solution will be injected through a well, permitted to remain in contact with the ore body for a period of time, and then withdrawn through the same well. The pregnant leaching solution is then passed to a metal (e.g. copper) recovery stage, a regeneration stage and ultimately reinjected.

There is thus provided by the present invention an economic hydrometallurgical method for the development of deep deposits of primary ores which have been economically unfeasible to mine by existing methods. Large increases in the reserves of, for example, low-cost copper and other elements may be obtained without the necessity of finding new ore deposits, because the type of deposit minable by the present method exists below many known deposits and can be developed easily. Also many new deposits are currently being discovered at depths which may be effectively mined by the present method. Moreover, with the method no dumps or open pits are produced which would disfigure the landscape; waste solutions are circulated back into the wellbore, thereby avoiding any stream pollution; and there is no atmospheric pollution common to other recovery operations such as smelting.

While the processes have been described as particularly effective in the in-situ mining of copper-bearing deposits, it is also within the scope of the present invention to treat other types of mineral-bearing deposits which contain, for example, cobalt, rhenium, selenium, molybdenum, uranium, nickel, zinc, and the like.

Although the invention has been hereinbefore described with respect to specific steps of the method thereof, it will be appreciated that various modifications and changes may be made therein without departing from the true spirit and scope of the invention, and thus it is not intended to limit the invention except by the terms of the following claims:

What is claimed is:

1. A process for the recovery of metal values contained in a primary sulfide mineral containing deep lying underground formation and which comprises the steps of:
    a. drilling at least one well into a primary sulfide mineral containing deep lying underground formation;
    b. casing and sealing at least a portion of said well;
    c. injecting an acidic leach solution containing nitrate ions into said formation through said well, the acidic leach solution having a pH value between about 0.5 and 1.5, containing from about 1 to about 10% by weight based on total weight of the acidic leach solution of a nitrate material selected from the group consisting of alkali metal nitrates, ammonium nitrates, ferric nitrate, nitric acid and mixtures thereof, and having a hydrogen ion to nitrate ion ratio of at least 4 whereby the acid in the acidic leach solution is not substantially consumer by host rock in the formation;

d. passing the acidic leach solution through said formation; and e. recovering a pregnant leach solution containing the dissolved metal values from at least one well.

2. The process as set forth in claim 1 wherein said acidic leaching solution is supplied at a pressure which does not cause any substantial uplifting or parting of said formation.

3. The process as set forth in claim 1 wherein the metal values are selected from the group consisting of copper, nickel, and mixtures thereof.

4. The process as set forth in claim 1 wherein the temperature of said acidic leaching solution in said formation is at least above about 30° C.

5. A process for the recovery of copper values from a deep lying underground primary copper sulfide containing formation wherein copper is, to the most extent in the form of chalcopyrite, and which comprises:

a. drilling at least one well into a copper sulfide mineral containing deep lying formation;

b. casing and sealing at least a portion of said well;

c. injecting an acidic leach solution containing nitrate ions into said formation through said well, the acidic leach solution having a pH value between about 0.5 and 1.5, containing from about 1 to about 10% by weight based on total weight of the acidic leach solution of a nitrate material selected from the group consisting of alkali metal nitrates, ammonium nitrates, ferric nitrate, nitric acid and mixtures thereof, and having a hydrogen ion to nitrate ion ratio of at least 4 whereby the acid in the acidic leach solution is not substantially consumer by host rock in the formation;

d. passing the acidic leach solution through said formation; and e. recovering a pregnant leach solution containing the dissolved copper values from at least one well.

6. The process as set forth in claim 5 wherein said acidic leaching solution is supplied at a pressure which does not cause any substantial uplifting or parting of said formation.

7. The process as set forth in claim 5 wherein the temperature of said acidic leaching solution in said formation is at least above about 30° C.

8. The process as set forth in claim 5 wherein the nitrate ions are supplied in the form of $HNO_3$.

9. The process as set forth in claim 5 wherein the pH values are controlled by the use of mixture of $H_2SO_4$ and other soluble inorganic sulfate salts.

* * * * *